United States Patent
Asakawa

(10) Patent No.: US 9,389,461 B2
(45) Date of Patent: *Jul. 12, 2016

(54) LIQUID CRYSTAL DISPLAY APPARATUS

(71) Applicant: Japan Display Inc., Minato-ku (JP)

(72) Inventor: Youichi Asakawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,123

(22) Filed: Mar. 19, 2014

(65) Prior Publication Data

US 2014/0285758 A1    Sep. 25, 2014

(30) Foreign Application Priority Data

Mar. 22, 2013 (JP) .................................. 2013-060336

(51) Int. Cl.
| | |
|---|---|
| *G02F 1/1337* | (2006.01) |
| *G02F 1/1343* | (2006.01) |
| *G02F 1/1333* | (2006.01) |

(52) U.S. Cl.
CPC ........ *G02F 1/1337* (2013.01); *G02F 1/133707* (2013.01); *G02F 1/134363* (2013.01); *G02F 2001/133354* (2013.01)

(58) Field of Classification Search
None
See application file for complete search history.

(56) References Cited

U.S. PATENT DOCUMENTS

| | | | | |
|---|---|---|---|---|
| 6,104,450 | A * | 8/2000 | Hiraishi | ........................ 349/48 |
| 6,177,973 | B1 * | 1/2001 | Lee | ..................... G02F 1/13378 |
| | | | | 349/123 |
| 2001/0048498 | A1 * | 12/2001 | Tomioka et al. | .............. 349/123 |
| 2014/0226114 | A1 * | 8/2014 | Asakawa | ............... G02F 1/1337 |
| | | | | 349/123 |

FOREIGN PATENT DOCUMENTS

| | | |
|---|---|---|
| JP | 60-230634 A | 11/1985 |
| JP | 2001-281671 A | 10/2001 |
| JP | 2010-008597 | 1/2010 |
| JP | 2012-53394 A | 3/2012 |

OTHER PUBLICATIONS

Author: Yeh, Pochi, Gu, Claire; Title: Optics of liquid crystal displays; date: 2010; Imprint: Hoboken, N.J. : Wiley, c2010; p. 21-24.*
Office Action issued Feb. 23, 2016 in Japanese Patent Application No. 2013-060336 (with English language translation).

* cited by examiner

*Primary Examiner* — Dung Nguyen
*Assistant Examiner* — Shan Liu
(74) *Attorney, Agent, or Firm* — Oblon, McClelland, Maier & Neustadt, L.L.P

(57) ABSTRACT

According to one embodiment, a liquid crystal display apparatus includes an array substrate, a counter-substrate and a liquid crystal layer formed of a negative liquid crystal material. The array substrate includes a common electrode, an insulating film, a plurality of pixel electrodes each provided with a slit, and a first alignment film. A ratio of a liquid crystal capacitance to a capacitance of the first alignment film (liquid crystal capacitance/alignment film capacitance) is equal to or smaller than a predetermined value. The formula $(e_s/d\_LC)/(e\_PI/d\_PI) \leq 0.0599$ is satisfied.

1 Claim, 5 Drawing Sheets

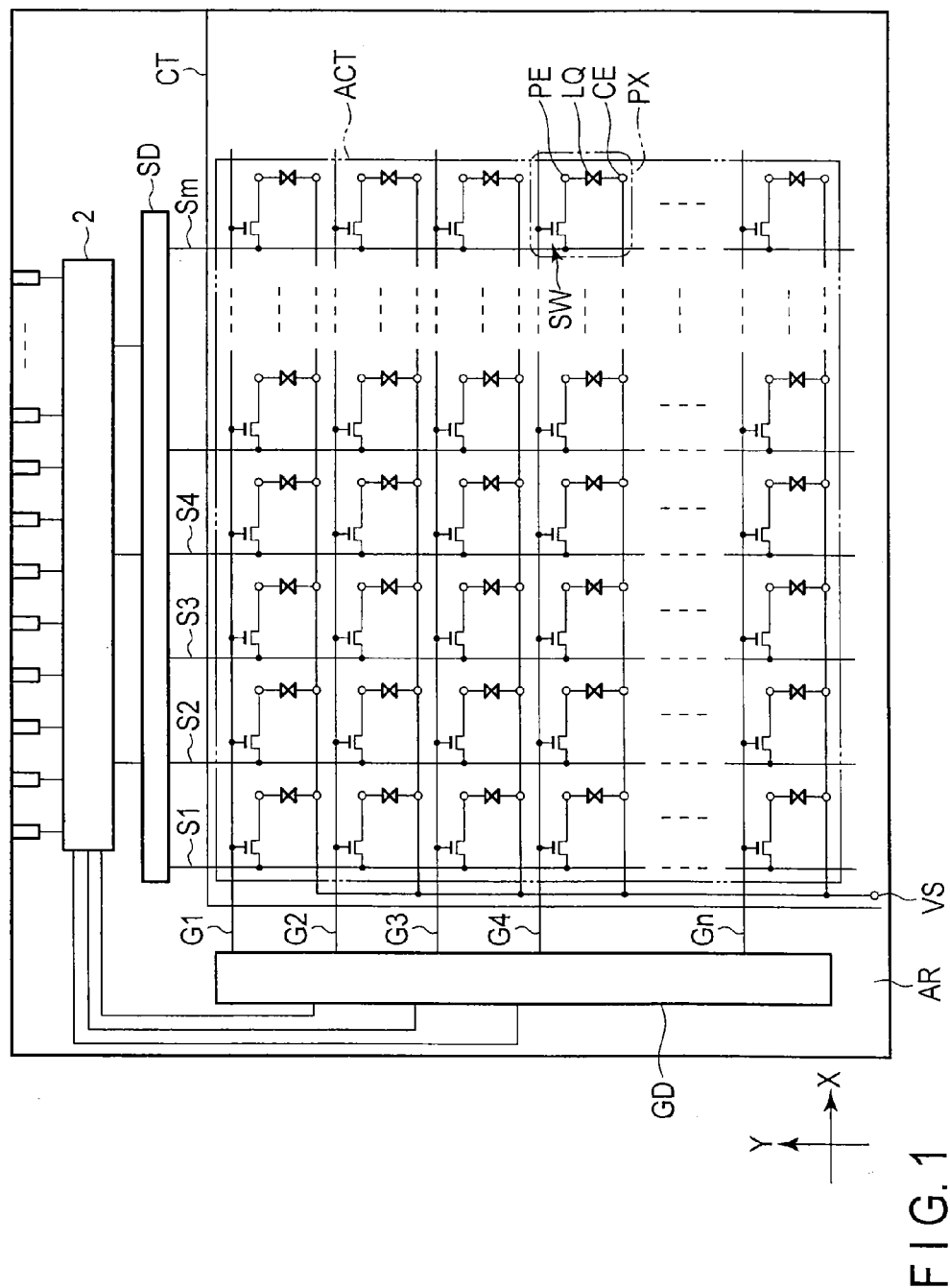
F I G. 1

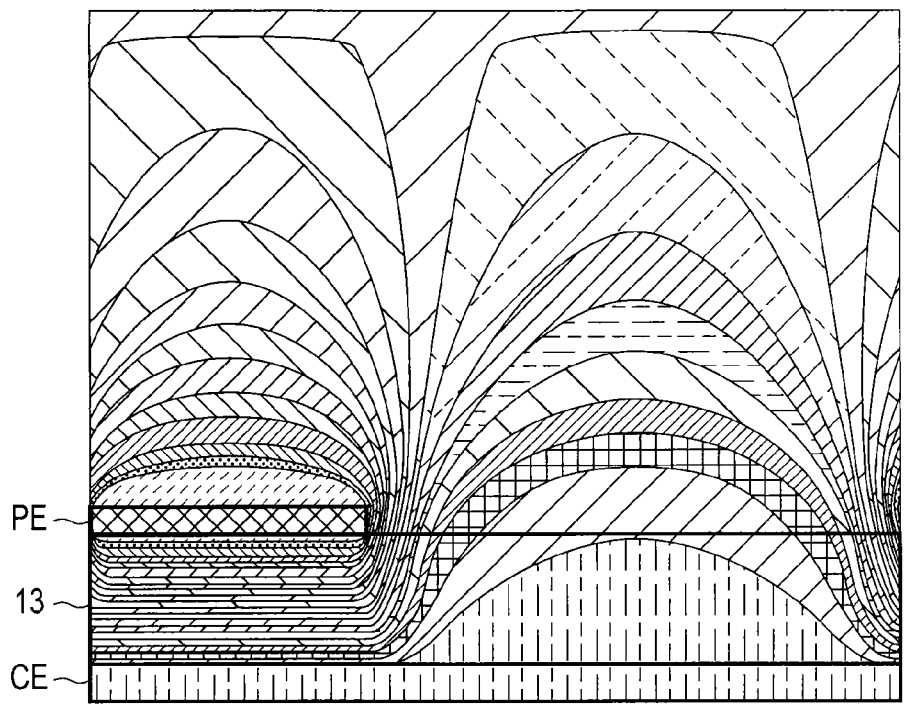
F I G. 6
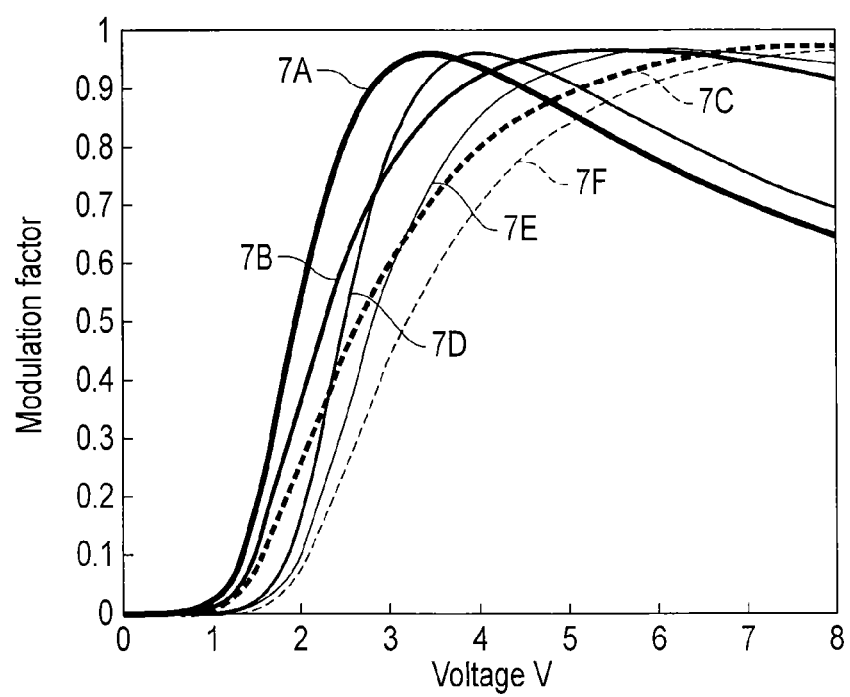
F I G. 7

LIQUID CRYSTAL DISPLAY APPARATUS

CROSS-REFERENCE TO RELATED APPLICATIONS

This application is based upon and claims the benefit of priority from Japanese Patent Application No. 2013-060336, filed Mar. 22, 2013, the entire contents of which are incorporated herein by reference.

FIELD

Embodiments described herein relate generally to a liquid crystal display apparatus.

BACKGROUND

Recently, flat display apparatuses have been remarkably developed and, especially, liquid crystal display apparatuses have been adopted as display apparatuses of various electronic apparatuses in view of benefits such as light weight, thin shape, and low power consumption. In particular, a structure using a lateral electric field of In-Plane Switching (IPS) mode, Fringe Field Switching (FFS) mode, etc., in active matrix type liquid crystal display apparatuses having switching elements embedded in respective pixels, has been noticed. The lateral electric field contains a fringe electric field. Each of the liquid crystal display apparatuses in such a lateral electric field mode comprises pixel electrodes and counter-electrodes formed on an array substrate, and switches liquid crystal molecules in a lateral electric field substantially parallel to a main surface of the array substrate.

BRIEF DESCRIPTION OF THE DRAWINGS

FIG. 1 schematically shows a structure of a liquid crystal display apparatus and an equivalent circuit of an embodiment;

FIG. 6 shows an example of a simulation result of an electric field distribution in a liquid crystal display apparatus in which the ratio of the liquid crystal capacitance/alignment film capacitance is greater than a predetermined value;

FIG. 7 shows examples of a modulation factor characteristic for a voltage, at each position of a liquid crystal layer for an array substrate;

DETAILED DESCRIPTION

Figure 2:
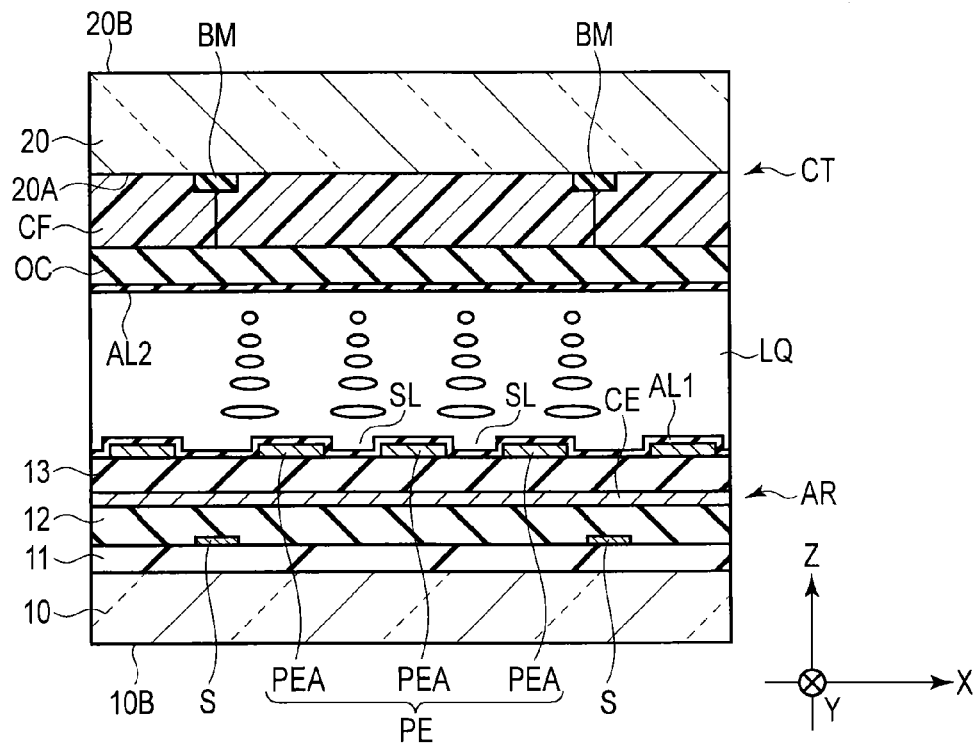
FIG. 2 schematically shows an example of a cross section in an active area of a liquid crystal display panel shown in FIG. 1.

In general, according to one embodiment, there is provided a liquid crystal display apparatus, comprising: an array substrate comprising a common electrode, an insulating film arranged on the common electrode, a plurality of pixel electrodes each arranged on the insulating film to be opposite to the common electrode and provided with a slit, and a first alignment film covering the insulating film and the pixel electrodes; a counter-substrate comprising a second alignment film disposed opposite to the first alignment film; and a liquid crystal layer held between the array substrate and the counter-substrate, brought into contact with the first alignment film and the second alignment film, and formed of a negative liquid crystal material. A ratio of a liquid crystal capacitance to a capacitance of the first alignment film (liquid crystal capacitance/alignment film capacitance) is equal to or smaller than a predetermined value. Where es is a dielectric constant of the liquid crystal layer in a direction vertical to a longer axis of liquid crystal molecules of the liquid crystal material, d_LC [µm] is a cell gap between the array substrate and the counter-substrate, e_PI is a dielectric constant of the first alignment film, and d_PI [µm] is a thickness of the first alignment film, the formula $(es/d\_LC)/(e\_PI/d\_PI) \leq 0.0599$ is satisfied.

The liquid crystal display apparatus of an embodiment will be hereinafter described with reference to the accompanying drawings.

FIG. 1 schematically shows a structure of a liquid crystal display apparatus and an equivalent circuit of the embodiment.

The liquid crystal display apparatus comprises an active matrix type liquid crystal display panel LPN. The liquid crystal display panel LPN comprises an array substrate AR which is a first substrate, a counter-substrate CT which is a second substrate arranged opposite to the array substrate AR, and a liquid crystal layer LQ held between the array substrate AR and the counter-substrate CT. The liquid crystal display panel LPN further comprises an active area ACT in which an image is displayed. The active area ACT is composed of a plurality of pixels PX arrayed in m×n matrix (where each of m and n is a positive integer).

The liquid crystal display panel LPN comprises n gate lines G (G1 to Gn), m source lines S (S1 to Sm), etc. in the active area ACT. The gate lines G are extended, for example, approximately linearly along first direction X. The gate lines G are alternately arranged parallel in second direction Y intersecting the first direction X. The first direction X and the second direction Y are substantially orthogonal to each other. The source lines S intersect the gate lines G. The source lines S are extended approximately linearly in the second direction Y. The gate lines G and the source lines S may not be extended linearly, but may be curved partially.

Each of the gate lines G is extended to an outside of the active area ACT and is connected to a gate driver GD. Each of the source lines S is extended to an outside of the active area ACT and is connected to a source driver SD. At least some sections of the source driver GD and the source driver SD are, for example, formed on the array substrate AR and are connected with a controller-embedded drive IC chip 2.

Each of the pixels PX comprises a switching element SW, a pixel electrode PE, a common electrode CE, etc.

In the liquid crystal display panel LPN of the embodiment, the pixel electrode PE and the common electrode CE are provided on the array substrate AR, and liquid crystal molecules of a liquid crystal layer LQ are switched by mainly using an electric field formed between the pixel electrode PE and the common electrode CE. The electric field formed between the pixel electrode PE and the common electrode CE is an oblique electric field which slightly tilts to an X-Y plane defined by the first direction X and the second direction Y or to a main surface of the substrate (or a lateral field substantially parallel to the main surface of the substrate).

The switching element SW is constituted by, for example, an n-channel thin film transistor (TFT). The switching element SW is electrically connected with the gate line G and the source line S. The switching element SW may be in a top-gate type or a bottom-gate type. The semiconductor layer of the switching element SW is formed of, for example, polysilicon but may be formed of amorphous silicon.

The pixel electrode PE is arranged in each of the pixels PX, and is electrically connected to the switching element SW. The common electrode CE is arranged commonly for the pixel electrode PE in each of a plurality of pixels PX through an insulating layer. The pixel electrode PE and the common electrode CE are formed of, for example, conductive materials having an optical transmission property such as Indium Tin Oxide (ITO) and Indium Zinc Oxide (IZO) but may be formed of the other metal materials such as aluminum.

The array substrate AR comprises a feeding portion VS configured to apply a voltage to the common electrode CE. The feeding portion VS is formed, for example, outside the active area ACT. The common electrode CE is extended to the outside of the active area ACT and is electrically connected with the feeding portion VS.

FIG. 2 schematically shows an example of a cross section of the active area of the liquid crystal display panel shown in FIG. 1.

The array substrate AR is formed by using a first insulating substrate 10 having a light transmission property. The source lines S are arranged on a first interlayer insulating film 11 and is covered with a second interlayer insulating film 12. The second interlayer insulating film 12 is a planarizing film, which is a transparent organic insulating film, in the present embodiment. Gate lines and storage capacitance lines (not shown) are arranged, for example, between the first insulating substrate 10 and the first interlayer insulating film 11. The common electrode CE is arranged on the second interlayer insulating film 12. A third interlayer insulating film 13 is arranged on the common electrode CE. Each of a plurality of pixel electrodes PE is arranged on the third interlayer insulating film 13 so as to be opposite to the common electrode CE. Slits SL extending in, for example, second direction Y are formed in the pixel electrode PE. The pixel electrode PE comprises a plurality of electrode portions PEA separated from each other by the slits SL. The common electrode CE is opposite to the plurality of pixel electrodes PE through the third interlayer insulating film 13.

A first alignment film AL1 is arranged on a plane opposite to the counter-substrate CT of the array substrate AR and extends over a substantially entire body of the active area ACT. The first alignment film AL1 covers the third interlayer insulating film 13, the pixel electrodes PE, etc. and is also arranged on the second interlayer insulating film 12. The first alignment film AL1 is formed of a material having a horizontal alignment property.

The counter-substrate CT is formed by using a second insulating substrate 20 having the light transmission property. The counter-substrate CT comprises black matrix BM, color filter CF, an overcoat layer OC, a second alignment film AL2, etc.

The black matrix BM partition each of the pixels PX and form an opening AP which is opposite to the pixel electrode PE. The black matrix BM is arranged to be opposite to wiring portions such as the source lines S, the gate lines, and the switching elements. Portions of the black matrix BM extending in the second direction Y alone are shown in the figure, but the black matrix BM may comprise portions extending in the first direction X. The black matrix BM is arranged on an inner surface 20A opposite to the array substrate AR of the second insulating substrate 20.

The color filter CF is arranged to correspond to the respective pixels PX. In other words, the color filter CF is arranged at the opening AP in the inner surface 20A of the second insulating film 20, and are partially overlaid on the black matrixes BM. The color filter CF comprises a plurality of colored layers. The colored layers arranged on the respective pixels PX adjacent to the first direction X are different in color from each other. For example, the colored layers are formed of resin materials colored in three primary colors of light, i.e., red, blue and green. A red colored layer CFR formed of the resin material colored in red is arranged to correspond to a red pixel. A blue colored layer CFB formed of the resin material colored in blue is arranged to correspond to a blue pixel. A green colored layer CFG formed of the resin material colored in green is arranged to correspond to a green pixel. Boundaries of the colored layers CF are positioned to overlap the black matrix BM.

The overcoat layer OC covers the color filter CF. The overcoat layer OC relaxes an influence of roughness on the surface of the color filter CF.

The second alignment film AL2 is arranged on the surface of the counter-substrate CT which is opposite to the array substrate AR, and is extended over a substantially entire surface of the active area ACT. The second alignment film AL2 covers the overcoat layer OC, etc. The second alignment film AL2 is formed of a material having a horizontal alignment property.

The first alignment film AL1 and the second alignment film AL2 are subjected to alignment treatment (for example, rubbing treatment or light alignment treatment) to initially align the liquid crystal molecules of the liquid crystal layer LQ in a predetermined direction. A state in which the voltage is not applied to the liquid crystal layer LQ, i.e., a state (at OFF time) in which a potential difference (or electric field) is not formed between the pixel electrode PE and the common electrode CE corresponds to the initial alignment state, and an alignment direction of the liquid crystal molecules LM at the OFF time corresponds to the initial alignment direction.

The array substrate AR and the counter-substrate CT are arranged such that the first alignment film AL1 and the second alignment film AL2 of the respective substrates are opposite to each other. At this time, for example, columnar spacers formed of a resin material, integrally with either of the substrates, are arranged between the array substrate AR and the counter-substrate CT. A predetermined cell gap is thereby formed. The array substrate AR and the counter-substrate CT are bonded to each other by a sealing member (not shown) outside the active area ACT, in a state in which the predetermined cell gap is formed.

The liquid crystal layer LQ is held in the cell gap formed between the array substrate AR and the counter-substrate CT, and is arranged between the first alignment film AL1 and the second alignment film AL2. The liquid crystal layer LQ is composed of a liquid crystal material having a negative dielectric anisotropy.

A first optical element (not shown) is bonded on an outer surface of the array substrate AR, i.e., an outer surface 10B of the first insulating substrate 10 constituting the array substrate AR, by an adhesive, etc. The first optical element is positioned at a side opposite to a backlight unit (not shown), of the liquid crystal display panel LPN, and is configured to control a polarized state of light incident on the liquid crystal display panel LPN from the backlight unit. The first optical element includes a first polarizer (not shown) having a first polarization axis (or a first absorption axis).

A second optical element (not shown) is bonded on an outer surface of the counter-substrate CT, i.e., an outer surface 20B of the second insulating substrate 20 constituting the counter-substrate CT, by an adhesive, etc. The second optical element is positioned at a side of a display surface of the liquid crystal display panel LPN, and is configured to control a polarized state of light emitted from the liquid crystal display panel LPN. The second optical element includes a second polarizer (not shown) having a second polarization axis (or a second absorption axis).

The first polarization axis of the first polarizer and the second polarization axis of the second polarizer have a positional relationship (cross-Nicol) of being, for example, vertical to each other. At this time, for example, either of the polarizers are arranged such that the polarization axis of the polarizer is parallel or vertical to the initial alignment direction of the liquid crystal molecules, i.e., the first alignment treatment direction or the second alignment treatment direction.

In the liquid crystal display apparatus, the liquid crystal material used for the liquid crystal layer LQ is a negative liquid crystal material having an absolute value of the dielectric constant equal to or smaller than a predetermined value, and a ratio of the liquid crystal capacitance to the alignment film capacitance of the first alignment film AL1 (liquid crystal capacitance/alignment film capacitance) is set to be equal to or smaller than a predetermined value.

More specifically, the liquid crystal capacitance is proportional to dielectric constant es of the liquid crystal layer LQ in a direction vertical to the longer axis of the liquid crystal molecules and inversely proportional to cell gap d_LC [μm]. The alignment film capacitance of the first alignment film AL1 is proportional to dielectric constant e_PI of the first alignment film AL1 and inversely proportional to thickness d_[μm] of the first alignment film AL1.

In the present embodiment, these values are set such that the liquid crystal material meets $$(es/d\_LC)/(e\_PI/d\_) \leq 0.0599$$

by taking advantage of this property. For example, the dielectric constant es of the liquid crystal layer LQ in a direction vertical to the longer axis of the liquid crystal molecules is 7.9, the cell gap d_LC is 3.3 [μm], the dielectric constant of the first alignment film AL1 is 4, and the thickness d_PI of the first alignment film AL1 is 0.1 [μm].

The initial alignment direction of the liquid crystal molecules LM is a direction tilted to a direction substantially orthogonal to the direction of extension of the slits SL or the direction of extension of the electrode portions PEA. An angle (bias angle) formed between the initial alignment direction and the direction tilted to the direction substantially orthogonal to the direction of extension of the slits SL or the direction of extension of the electrode portions PEA, is set to be a predetermined angle. In other words, an angle formed inside by a first imaginary straight line substantially orthogonal to the direction of extension of the slits SL or the direction of extension of the electrode portions PEA and a second imaginary straight line extending in the initial alignment direction is set to be a predetermined angle. The bias angle θ is defined by the alignment treatment directions of the first alignment film AL1 and the second alignment film AL2.

In the liquid crystal display apparatus, the liquid crystal molecules LM of the liquid crystal layer LQ are aligned such that the longer axis of the liquid crystal molecules LM is directed in the first alignment treatment direction of the first alignment film AL1 and the second alignment treatment direction of the second alignment film AL2, in a state in which the voltage is not applied to the liquid crystal layer LQ, i.e., a state (OFF time) in which a potential difference (or electric field) is not formed between the pixel electrode PE and the common electrode CE. The OFF time corresponds to the initial alignment state, and the alignment direction of the liquid crystal molecules LM at the OFF time corresponds to the initial alignment direction.

Part of backlight from a backlight unit passes through a first polarizer PL1 and is made incident on the liquid crystal display panel LPN. A polarized state of the light incident on the liquid crystal display panel LPN is varied depending on the aligned state of the liquid crystal molecules LM when the light passes through the liquid crystal layer LQ. At the OFF time, the light passing through the liquid crystal layer LQ is absorbed into a second polarizer PL2 (black display).

On the other hand, a lateral electric field (or an oblique electric field) substantially parallel to the substrate is formed between the pixel electrode PE and the common electrode CE, in a state in which the voltage is applied to the liquid crystal layer LQ, i.e., a state (ON time) in which a potential difference (or an electric field) is formed between the pixel electrode PE and the common electrode CE. The liquid crystal molecules LM are influenced by the electric field and are rotated in a plane substantially parallel to plane X-Y.

At the ON time, part of the backlight incident on the liquid crystal display panel LPN from the backlight unit passes through the first polarizer PL1 and is made incident on the liquid crystal display panel LPN. A polarized state of the backlight incident on the liquid crystal layer LQ is varied. At the ON time, at least part of the light passing through the liquid crystal layer LQ passes through the second polarizer PL2 (white display).

The bias angle θ is set to be, for example, a predetermined angle to prevent a reverse domain from occurring in the liquid crystal layer LQ. If the dielectric anisotropy is the positive liquid crystal, a director of the liquid crystal molecules LM tends to be deformed in cell gap direction Z, by a longitudinal electric field component generated between the pixel electrode PE and the common electrode CE, and between the pixel electrode PE/common electrode CE and the counter-substrate CT, and the reverse domain may occur by application of the high voltage or by pressing even if a predetermined bias angle is set. On the other hand, in a liquid crystal display apparatus employing the negative liquid crystal, a desirable result on the reverse domain can be obtained from the positive liquid crystal since the director of the liquid crystal molecules LM is not substantially deformed in the cell gap direction Z, by the longitudinal electric field component generated between the pixel electrode PE and the common electrode CE.

In other words, in the FFS-mode liquid crystal display apparatus employing the negative liquid crystal, a smaller number of liquid crystal molecules are aligned in the cell gap direction Z (i.e., tilt angle) when the voltage is applied to the pixel electrode PE and the common electrode CE, as compared with the FFS-mode liquid crystal display apparatus employing the positive liquid crystal. For this reason, when the negative liquid crystal is employed, the reverse domain hardly occurs even if the bias angle is small.

In the liquid crystal display apparatus employing the positive liquid crystal, the bias angle is an angle of the initial alignment direction of the liquid crystal molecules in view of the direction of extension of the slits, in the pixel electrode.

In the negative liquid crystal, however, synthesis of low-viscosity liquid crystal materials is more difficult as compared with that in the positive liquid crystal, and the drive voltage tends to be higher than that in the positive liquid crystal when the response time is substantially shortened.

The present inventors, considering the above-described circumstances, have found that in the FFS-mode liquid crystal display apparatus employing the negative liquid crystal, the drive voltage can be lowered and the high-speed response can be implemented by setting an absolute value of the dielectric constant of the liquid crystal materials to be small such that the ratio of the liquid crystal capacitance to the alignment film capacitance in the first alignment film AL1 (liquid crystal capacitance/alignment film capacitance) is equal to or smaller than a predetermined value.

Figure 3:
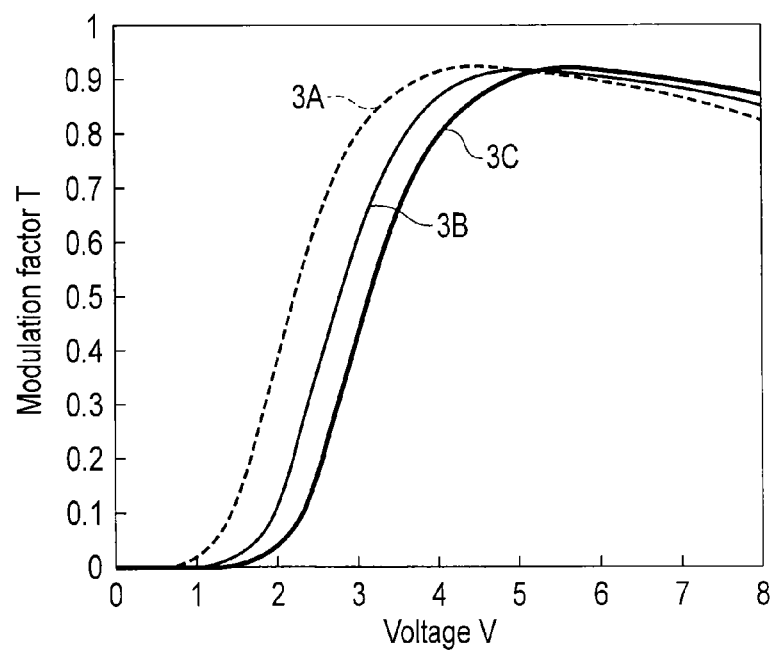
FIG. 3 shows examples of a relationship between a modulation factor and a voltage applied to a liquid crystal layer, in a plurality of negative liquid crystal materials.

FIG. 3 shows an example of a relationship between a modulation factor T and a voltage applied to the liquid crystal layer LQ, in a plurality of negative liquid crystal materials. The modulation factor T represents a factor of a transmittance at cross-Nicol at each voltage divided by a transmittance at parallel Nicol upon applying no voltage. At this time, at both the cross-Nicol and the parallel Nicol, the transmission axis of the polarizer at the backlight side (array substrate AR side) corresponds to the initial alignment direction (longer axis of the liquid crystal molecules upon applying no voltage).

The figure shows V-T factors of three negative liquid crystal materials different in the absolute value of the dielectric constant alone. Graph 3A represents a characteristic of the liquid crystal material having the smallest absolute value of the dielectric constant. Graph 3B and Graph 3C represent characteristics of the liquid crystal materials having smaller absolute values of the dielectric constant in the order. The liquid crystal materials are the same as each other in view of difference (Δe) between a vertical dielectric constant and a horizontal dielectric constant.

Comparison of Graphs 3A-3C indicates that the modulation factor at a peak is substantially constant in the liquid crystal materials, but a peak value of the modulation factor can be obtained at the lowest voltage, from the liquid crystal material having the smallest absolute value of the dielectric constant. In other words, the response tends to be made at the low voltage in the liquid crystal materials having the smaller absolute values of the dielectric constant.

Figure 4:
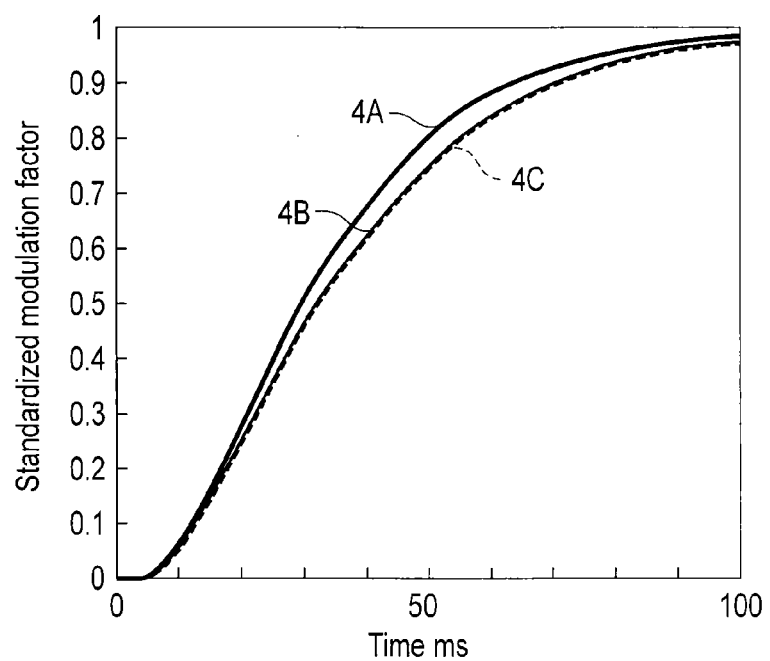
FIG. 4 shows examples of a relationship between a standardized modulation factor and a response time, in a plurality of negative liquid crystal materials.

FIG. 4 shows an example of each relationship between a standardized modulation factor and a response time, in a plurality of negative liquid crystal materials.

An example of each relationship between the standardized modulation factor and the response time, in three negative liquid crystal materials different in the absolute value of the dielectric constant alone, similarly to those shown in FIG. 3, is shown in the figure. Graph 4A represents a characteristic of the liquid crystal material having the smallest absolute value of the dielectric constant. Graph 4B and Graph 4C represent characteristics of the liquid crystal materials having smaller absolute values of the dielectric constant in the order. The liquid crystal materials are the same as each other in view of difference (Δe) between the vertical dielectric constant and the horizontal dielectric constant.

Comparison of Graphs 4A-4C indicates a tendency that the response time is shorter as the absolute value of the dielectric constant in the liquid crystal materials is smaller.

Considering that the drive voltage is lower and the response time is shorter as the absolute value of the dielectric constant in the liquid crystal materials is smaller, as described above, the present inventors have found that the drive voltage can be lowered and the response time can be shortened in the liquid crystal display apparatus employing the negative liquid crystal.

In other words, the liquid crystal material used for the liquid crystal layer LQ is the negative liquid crystal material, and the drive voltage becomes sufficiently lower and the response time becomes sufficiently shorter by setting the dielectric constant of the liquid crystal material such that the ratio of the liquid crystal capacitance to the alignment film capacitance in the first alignment film AL1 (liquid crystal capacitance/alignment film capacitance) is equal to or smaller than a predetermined value.

Figure 5:
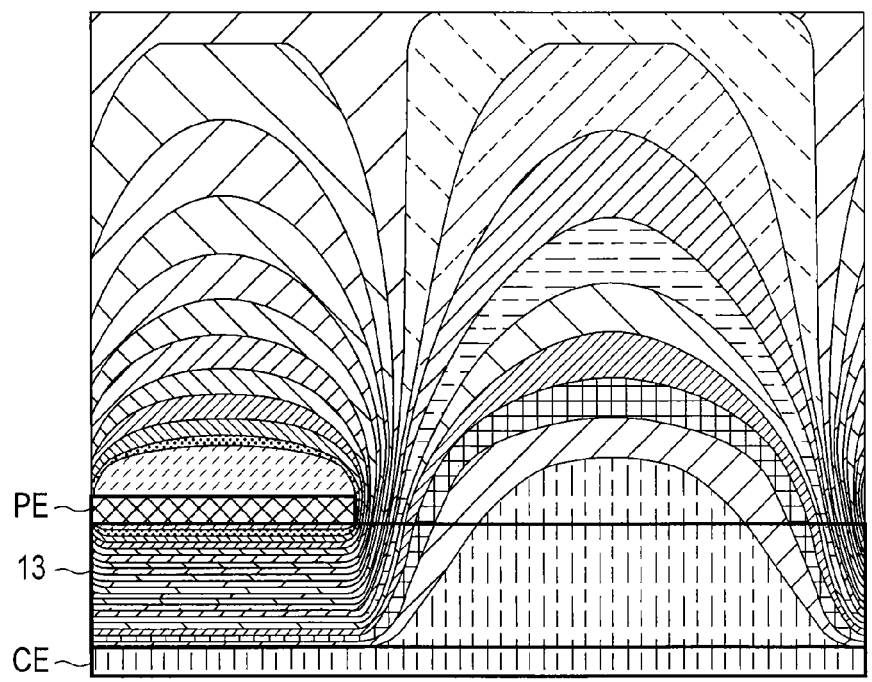
FIG. 5 shows an example of a simulation result of an electric field distribution in a liquid crystal display apparatus in which a ratio of a liquid crystal capacitance/alignment film capacitance is equal to or smaller than a predetermined value.

FIG. 5 shows an example of a simulation result of an electric field distribution in the liquid crystal display apparatus in which the ratio of the liquid crystal capacitance/alignment film capacitance is equal to or smaller than a predetermined value. A simulation result of employing a negative liquid crystal material which meets $(es/d\_LC)/(e\_PI/d\_PI) \leq 0.0599$ is shown in the figure.

FIG. 6 shows an example of a simulation result of an electric field distribution in the liquid crystal display apparatus in which the ratio of the liquid crystal capacitance/alignment film capacitance is greater than a predetermined value. A simulation result of employing a negative liquid crystal material which meets $(es/d\_LC)/(e\_PI/d\_PI) \leq 0.0599$ is shown in the figure.

In each of the cases, the electric field generated between the common electrode CE and the pixel electrode PE when a predetermined voltage is applied to the pixel electrode PE and the common electrode CE is illustrated by equifield lines spaced apart at predetermined intervals.

Comparison between the simulation result shown in FIG. 5 and the simulation result shown in FIG. 6 indicates that when the liquid crystal material in which the ratio of the liquid crystal capacitance/alignment film capacitance is equal to or smaller than a predetermined value is used, the gradation of the electric field is sharp at the end portion of the pixel electrode PE and the high electric field is generated in a wider range. In the simulations, the electric potential at the interface between the liquid crystal layer LQ and the first alignment film AL1 becomes close to a neighboring electrode potential when the liquid crystal material in which the ratio of the liquid crystal capacitance/alignment film capacitance is equal to or smaller than a predetermined value is used.

FIG. 7 shows examples of a modulation factor characteristic for a voltage, at each position of a liquid crystal layer for an array substrate AR.

Graphs 7A-7C show examples of a modulation factor characteristic to the voltage in the negative liquid crystal material in which the absolute value of the dielectric constant is equal to or smaller than a predetermined value. Graphs 7D-7F show examples of a modulation factor characteristic to the voltage in the negative liquid crystal material in which the absolute value of the dielectric constant is greater than a predetermined value.

In addition, Graphs 7A and 7D show examples of the modulation factor characteristic of the liquid crystal in vicinity of an end portion of the electrode portion PEA (i.e., an interface between the electrode portion PEA and the slit SL). Graphs 7B and 7E show examples of the modulation factor characteristic of the liquid crystal in vicinity of the electrode portion PEA remote from the slit SL. Graphs 7C and 7F show examples of the modulation factor characteristic of the liquid crystal in vicinity of the slit SL remote from the electrode portion PEA.

Comparison between Graphs 7A-7C and Graphs 7D-7F indicates that the modulation factor becomes high at a low voltage, in the liquid crystal display apparatus employing the negative liquid crystal material in which the absolute value of the dielectric constant is equal to or smaller than a predetermined value, irrespective of the position of the liquid crystal layer LQ. In particular, a high modulation factor can be obtained at a low voltage, in vicinity of the end portion of the electrode portion PEA, in the liquid crystal display apparatus employing the negative liquid crystal material in which the absolute value of the dielectric constant is equal to or smaller than a predetermined value.

Figure 8:
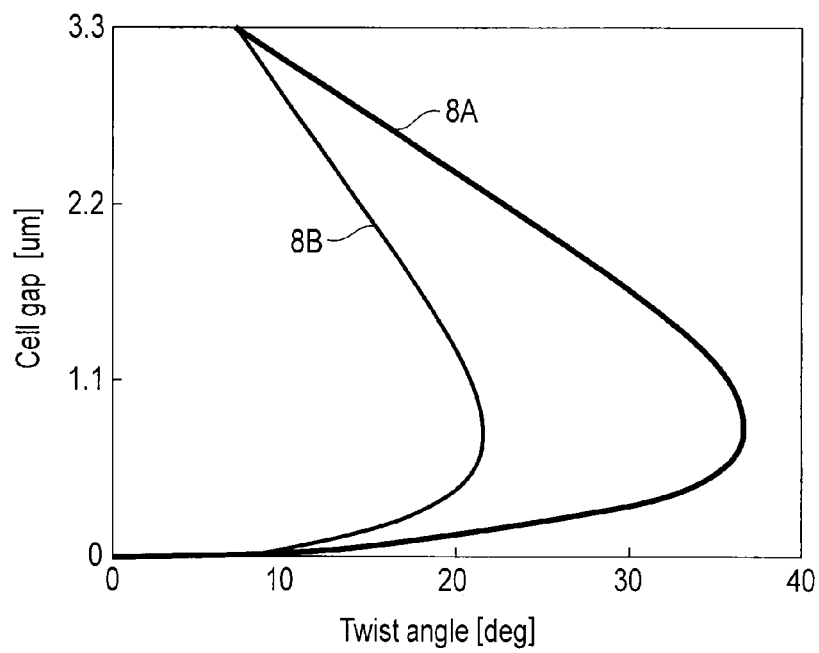
FIG. 8 shows examples of a relationship between a twist angle in liquid crystal molecules and a cell gap, in vicinity of an end portion of an electrode.

FIG. 8 shows examples of a relationship between the twist angle (rotational angle from the bias angle) of the liquid crystal molecules and the cell gap, in vicinity of the end portion of the electrode portion PEA.

Graph 8A shows an example of the relationship between the twist angle of the liquid crystal molecules and a position in Z direction at the cell gap, in the liquid crystal display apparatus employing the negative liquid crystal material in which the absolute value of the dielectric constant is equal to or smaller than a predetermined value, when the voltage between the pixel electrode PE and the common electrode CE is a predetermined value (for example, 2V). Graph 8B shows an example of the relationship between the twist angle of the liquid crystal molecules and a position in Z direction at the cell gap, in the liquid crystal display apparatus employing the negative liquid crystal material in which the absolute value of the dielectric constant is greater than a predetermined value, when the voltage between the pixel electrode PE and the common electrode CE is a predetermined value (for example, 2V). A boundary between the array substrate AR and the liquid crystal layer LQ is set to be 0 μm and a boundary between the counter-substrate CT and the liquid crystal layer LQ is set to be 3.3 μm.

Comparison between Graph 8A and Graph 8B indicates a result that the twist angle becomes great at any position in the Z direction in the liquid crystal layer LQ when the negative liquid crystal in which the absolute value of the dielectric constant is equal to or smaller than a predetermined value is employed. In other words, it is considered that the liquid crystal molecules can be rotated at a predetermined twist angle, at a lower voltage, by employing the negative liquid crystal in which the absolute value of the dielectric constant is equal to or smaller than a predetermined value.

It is considered from the simulation results shown in FIGS. 5-8 that the electric field in vicinity of the end portion of the electrode portion PEA becomes great by using the liquid crystal material in which the absolute value of the dielectric constant (liquid crystal capacitance/alignment film capacitance) is equal to or smaller than a predetermined value, for the reason that the field loss in the first alignment film AL1 becomes reduced and the field density at the end portion of the pixel electrode PE becomes great.

Figure 9:
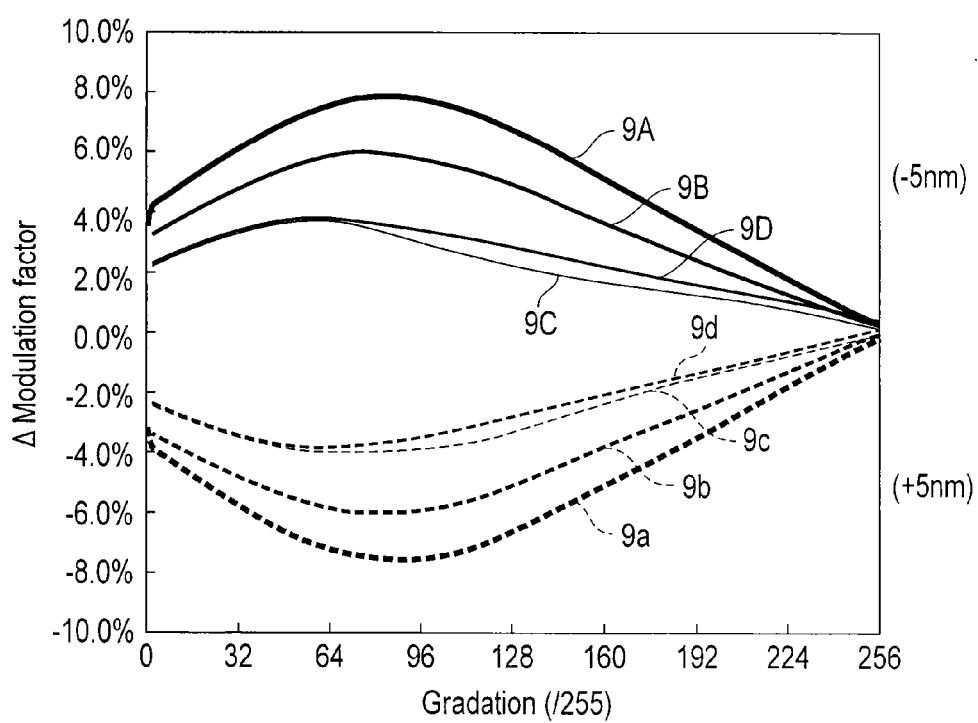
FIG. 9 shows examples of a variation amount of the modulation factor to a variation in thickness of a first alignment film, in the liquid crystal display apparatus employing a plurality of liquid crystal materials.

FIG. 9 shows examples of a variation amount of the modulation factor to a variation in thickness of the first alignment film AL1, in the liquid crystal display apparatus employing a plurality of liquid crystal materials.

Examples of simulation results of three negative liquid crystal materials and one positive liquid crystal material are shown in the figure. Graphs 9A-9C and Graphs 9a-9c represent the simulation results of the negative liquid crystal materials, and the liquid crystal materials having higher dielectric constants are represented by Graphs 9A (9a), 9B (9b) and 9C (9c) in the order. The characteristic represented by Graph 9C (9c) is the characteristic in the liquid crystal display apparatus configured to meet (es/d_LC)/(e_PI/d_PI)≤0.0599. Graphs 9D and 9d represent the simulation results of the positive liquid crystal material. The liquid crystal materials are the same as each other in view of difference (Δe) between the vertical dielectric constant and the horizontal dielectric constant, and are different in view of the absolute value of the dielectric constant alone.

In addition, variation amounts of the modulation factor (Δ modulation factors) in a case where the thickness of the first alignment film AL1 is set to be −5 nm from that in a case where the thickness is set to be ±0 are represented by Graphs 9A-9D. Variation amounts of the modulation factor (Δ modulation factors) in a case where the thickness of the first alignment film AL1 is set to be +5 nm from that in a case where the thickness is set to be ±0 are represented by Graphs 9a-9d.

Comparison of the simulation results of the negative liquid crystal materials indicates that as the absolute value of the dielectric constant is higher, the variation amount of the modulation factor to the variation in the thickness of the first alignment film AL1 is greater and the dependency on the variation in the thickness in the first alignment film AL1 is greater. In the simulation results of the negative liquid crystal materials having the smallest absolute value of the dielectric constant (Graphs 9C and 9c), the dependency on the variation in the thickness of the first alignment film AL1 is substantially the same as that in the simulation results of the positive liquid crystal material (Graphs 9D and 9d).

In other words, in the liquid crystal display apparatus configured to meet (es/d_LC)/(e_PI/d_PI)≤0.0599, results can be obtained that the variation in the modulation factor to the variation in the thickness of the first alignment film AL1 is substantially the same as that in the positive liquid crystal display apparatus, and that occurrence of the non-uniformity in display caused by the non-uniformity in thickness of the first alignment film AL1 can be sufficiently prevented.

As described above, the embodiment can provide the liquid crystal display apparatus capable of suppressing deterioration in the display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus, comprising:
    an array substrate comprising a common electrode, an insulating film arranged on the common electrode, a plurality of pixel electrodes each arranged on the insulating film to be opposite to the common electrode and provided with a slit, and a first alignment film covering the insulating film and the pixel electrodes;
    a counter-substrate comprising a second alignment film disposed opposite to the first alignment film; and
    a liquid crystal layer held between the array substrate and the counter-substrate, brought into contact with the first alignment film and the second alignment film, and formed of a negative liquid crystal material,
    wherein
    a ratio of a liquid crystal capacitance to a capacitance of the first alignment film (liquid crystal capacitance/alignment film capacitance) is equal to or smaller than a predetermined value,
    where es is a dielectric constant of the liquid crystal layer in a direction vertical to a longer axis of liquid crystal molecules of the liquid crystal material, d_LC [μm] is a cell gap between the array substrate and the counter-substrate, e_PI is a dielectric constant of the first alignment film, and d_PI [μm] is a thickness of the first alignment film, the formula (es/d_LC)/(e_PI/d_PI)≤0.0599 is satisfied.
wherein a boundary between the array substrate and the liquid crystal layer is set to be 0 μm and a boundary between the counter-substrate and the liquid crystal layer LQ is set to be 3.3 μm.

* * * * *